(12) United States Patent  
Koenig et al.

(10) Patent No.: US 9,020,740 B2
(45) Date of Patent: Apr. 28, 2015

(54) FLUID PUMP SPEED CONTROL

(71) Applicant: GM Global Technology Operations LLC, Detroit, MI (US)

(72) Inventors: John J. Koenig, Howell, MI (US); Terry S Johnecheck, Brighton, MI (US); Robert E. Rhein, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 88 days.

(21) Appl. No.: 13/651,508

(22) Filed: Oct. 15, 2012

(65) Prior Publication Data

US 2014/0105756 A1 Apr. 17, 2014

(51) Int. Cl.
*F04B 49/06* (2006.01)
*F01P 7/16* (2006.01)
*F02D 41/06* (2006.01)

(52) U.S. Cl.
CPC ............... *F01P 7/167* (2013.01); *F02D 41/062* (2013.01)

(58) Field of Classification Search
CPC ...... F01P 7/167; F16H 1/0021; F02D 41/062; F04C 2/102
USPC ............ 701/112, 113, 102; 123/41.02, 41.04, 123/41.11, 41.12; 475/127, 129
See application file for complete search history.

(56) References Cited

U.S. PATENT DOCUMENTS

| | | | |
|---|---|---|---|
| 7,347,168 B2 * | 3/2008 | Reckels et al. | 123/41.11 |
| 7,467,605 B2 * | 12/2008 | Szalony et al. | 123/41.04 |
| 7,578,761 B2 * | 8/2009 | Nishikawa et al. | 475/127 |
| 8,109,138 B2 * | 2/2012 | Han et al. | 73/114.55 |
| 8,382,626 B2 * | 2/2013 | Moorman et al. | 475/129 |
| 8,401,768 B2 * | 3/2013 | Lewis et al. | 701/112 |
| 8,414,270 B2 * | 4/2013 | Sah et al. | 417/18 |
| 8,480,537 B2 * | 7/2013 | Sano et al. | 477/5 |
| 8,591,365 B2 * | 11/2013 | Moorman et al. | 475/129 |
| 8,608,619 B2 * | 12/2013 | Wakayama et al. | 477/98 |
| 8,616,323 B1 * | 12/2013 | Gurin | 180/305 |
| 2007/0261648 A1 * | 11/2007 | Reckels et al. | 123/41.12 |
| 2009/0050433 A1 * | 2/2009 | Ronk et al. | 192/104 C |
| 2009/0293468 A1 * | 12/2009 | Kim | 60/327 |
| 2010/0122571 A1 * | 5/2010 | Han et al. | 73/54.01 |
| 2010/0139582 A1 * | 6/2010 | Bilezikjian et al. | 123/41.02 |
| 2011/0206537 A1 * | 8/2011 | Simpson | 417/1 |
| 2012/0304635 A1 * | 12/2012 | Ooi et al. | 60/431 |
| 2013/0152892 A1 * | 6/2013 | Hawkins et al. | 123/142.5 E |
| 2013/0211698 A1 * | 8/2013 | Lewis et al. | 701/112 |
| 2013/0268182 A1 * | 10/2013 | Treharne et al. | 701/113 |
| 2014/0105756 A1 * | 4/2014 | Koenig et al. | 417/44.1 |

\* cited by examiner

*Primary Examiner* — Thomas G Black
*Assistant Examiner* — Wae Louie
(74) *Attorney, Agent, or Firm* — Quinn Law Group, PLLC

(57) ABSTRACT

A system includes a sump, a pump having a steady-state speed, a fluid component that receives the fluid from the fluid pump, and a controller. The controller detects a soak condition of the system in which the pump load is low as fluid is moved into vacated fluid passages. The steady-state speed of the pump is temporarily increased by adding a calibrated overspeed value to the steady-state speed, for a calibrated duration. The controller reduces the pump speed to the steady-state speed after the calibrated duration has elapsed. A method includes detecting the soak condition and temporarily increasing the steady-state speed via the controller by adding the calibrated overspeed value to the steady-state speed, for a calibrated duration, when the soak condition is detected. A control system includes a processor and storage medium having instructions embodying the method, with detection of the soak condition provided via measurement of fluid temperature.

17 Claims, 2 Drawing Sheets

| $T_F$ | $N_O(RPM)$ | $T_{D(S)}$ |
|---|---|---|
| -10°C | 5-10 | 1-5 |
| -25°C | 20-40 | 10-15 |
| -40°C | 50-100 | 20-30 |

FLUID PUMP SPEED CONTROL

TECHNICAL FIELD

The present disclosure relates to the speed control of a fluid pump.

BACKGROUND

Fluid pumps are used in hydraulic systems to circulate fluid under pressure to various hydraulic components. For instance, conventional vehicles typically use an engine-driven fluid pump to circulate transmission fluid to various clutches, cooler systems, and other points of use within a powertrain. A supply of the fluid is retained in a sump at a low point of the powertrain. The pump draws the fluid from the sump and moves the fluid through the various fluid paths of the vehicle's hydraulic system. Engine-driven pumps quickly spin up after engine start to move this fluid to where it is needed in the system.

In a hybrid electric or a battery electric powertrain, the engine-driven pump may be accompanied or replaced by an electrically driven pump. Hybrid electric powertrains may use an electric pump to augment the functionality of the engine-driven pump, e.g., during engine off periods. Other hybrid electric powertrains, as well as battery electric powertrains, may eliminate the engine-driven pump altogether. Electric pumps are considered to be torque-limited relative to the levels of torque generated by engine-driven pumps, which is largely a result of physical limits on the electrical current that the pump can receive.

SUMMARY

A hydraulic system is disclosed herein that includes an electric or other torque-limited pump. Such a pump may be flow or pressure constrained by its input torque capability such that the system performance is inadequate under certain conditions. In the case of the electric pump, subjecting the hydraulic fluid to cold temperature increases pump loading due to increased viscosity, thus limiting the steady-state flow/pressure output of the pump. Following an episode of running the hydraulic system, the pump is switched off. During this interval of time known as a "soak period", fluid residing in a valve body, various fluid channels, and other devices of the hydraulic system drains to the lowest point of the system, i.e., a fluid sump. The system is therefore substantially devoid of fluid after a soak period has elapsed.

Upon restart of the hydraulic system, the ability to move the fluid from the sump and back to the required points of use is typically determined by the viscosity curve of the fluid, which in turn depends on the temperature of the fluid whilst respecting the pump torque limit. Therefore, a user might notice an unacceptably delayed start cycle during a cold start of, for instance, an electric pump-equipped vehicle, since all of the fluid evacuated during the soak period must be replaced before normal operation is resumed.

The control method that is disclosed herein exploits the lower pump loading condition present as the evacuated fluid channels of the hydraulic system are refilled at high flow rate and resulting low pressure. The method serves to reduce restart delay by increasing the speed of the pump after a soak period in a temperature-dependent manner. This includes command of a time-limited overspeed value that temporarily pushes the speed of the pump beyond its steady-state operating speed. As used herein, the term "overspeed" refers to a higher speed than what is ordinarily possible under a normal operating, steady-state condition.

In particular, a system is disclosed herein that includes a fluid sump, a positive displacement fluid pump, a component in fluid communication with the fluid pump, and a controller. The fluid component receives the fluid that is circulated by the pump. The controller detects a soak condition, for instance by measuring a temperature of the fluid in the sump or via a timer, temporarily increases a steady-state speed of the pump. This is done by adding a calibrated overspeed value to the steady-state speed for a calibrated duration, which may coincide with time required for refilling of any evacuated fluid channels. The controller then reduces the speed of the fluid pump to the steady-state speed after the calibrated duration has elapsed in order to resume normal operation.

A method is also disclosed that includes detecting the soak condition using a controller, and temporarily increasing the steady-state speed of a fluid pump, via the controller, by adding a calibrated overspeed value to the steady-state speed for a calibrated duration. The method may also include reducing the speed of the fluid pump back to the steady-state speed after the calibrated duration has elapsed.

Additionally, a control system for controlling a fluid pump includes a processor in communication with the fluid pump, and a tangible, non-transitory storage medium on which is recorded a lookup table and instructions for controlling the speed of the fluid pump. The processor is configured to execute the instructions from the storage medium to receive a measured fluid temperature, determine a steady-state speed of the fluid pump, and extract, from the lookup table, a calibrated overspeed value and a calibrated duration corresponding to the measured fluid temperature. The processor then temporarily increases the steady-state speed of the fluid pump by adding a calibrated overspeed value to the steady-state speed, for a calibrated duration, only so long as the measured fluid temperature exceeds a temperature threshold, and/or until a timer expires. The processor also reduces the speed of the fluid pump to the steady-state speed after the calibrated duration has elapsed.

The above features and advantages and other features and advantages of the present invention are readily apparent from the following detailed description of the best modes for carrying out the invention when taken in connection with the accompanying drawings.

DETAILED DESCRIPTION

Figure 1:
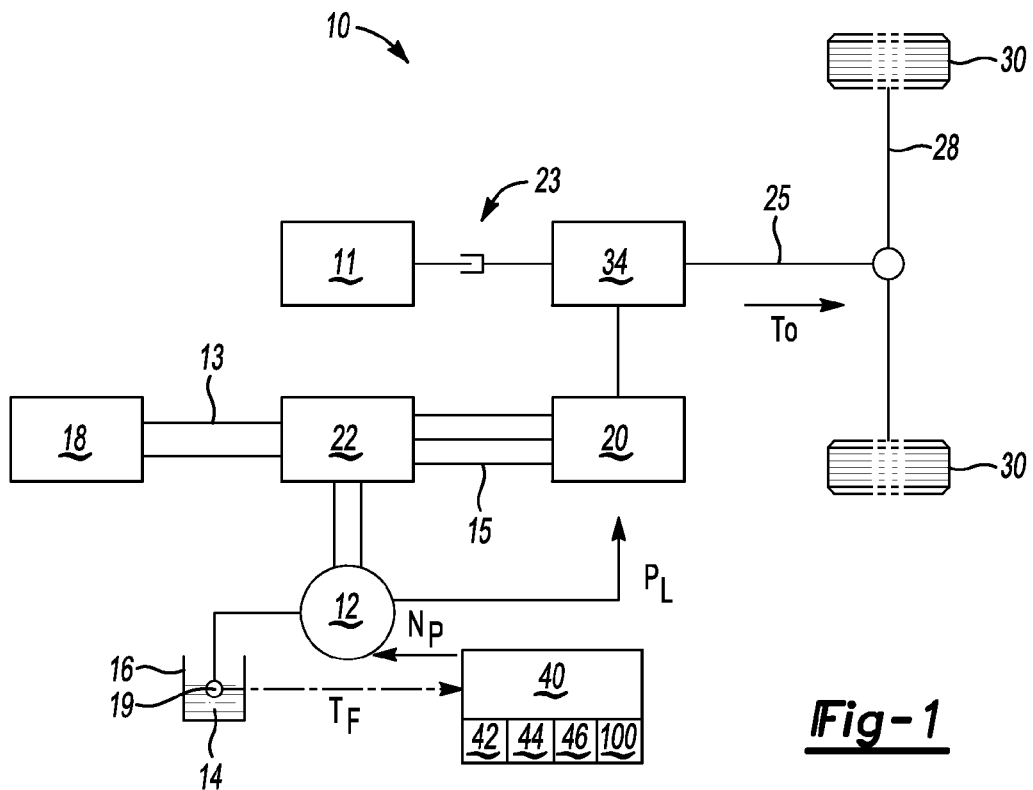
FIG. 1 is a schematic illustration of a vehicle having a fluid pump and a controller that controls the speed of the fluid pump as set forth herein.

Referring to the drawings, wherein like reference numbers refer to like components throughout the several Figures, and beginning with FIG. 1, an example vehicle 10 includes a torque-limited fluid pump 12. As used herein, the term "torque-limited" means a relatively low level of maximum output torque relative to the torque levels generated by engine-driven fluid pumps. By comparison, an engine-driven fluid pump may have a torque rating in excess of 100 Nm, while the fluid pump 12 used herein may be less than 10% of this value.

The fluid pump 12 may be configured as an electrical pump in the example embodiment shown in FIG. 1. Torque is limited in such a design due largely to physical limits on the amount of electrical current that the fluid pump 12 can safely receive and process. For instance, the various windings of the rotor and stator of the internal pump motor (not shown), as with all electric machines, are current limited and, by extension, torque-limited. In other embodiments the fluid pump 12 may be an off-axis pump that is driven via a chain and sprocket or other reduction gear set, with the mechanical linkage in such an embodiment directly limiting the output torque that can be transferred off-axis.

While the vehicle 10 of FIG. 1 is described in all of the illustrative examples that follow, those of ordinary skill in the art will appreciate that the present pump speed control approach may be employed in any hydraulic system exposed to extreme cold temperatures in which a device similar to the torque-limited fluid pump 12 is used. Vehicles, which are frequently parked on streets or driveways during the winter months for extended period of time, particularly overnight, are thus representative of the types of hydraulic systems with which the present control approach might be beneficial.

The fluid pump 12 shown in FIG. 1 is in communication with a controller 40, for example a hybrid controller. As explained below with reference to FIGS. 2-4, the controller 40 controls the rotational speed of the fluid pump 12 via transmission of speed control signals (arrow $N_P$) over a controller area network (CAN) bus or other suitable communications channel. The controller 40 also executes instructions embodying a pump speed control method 100 to temporarily elevate the speed of the fluid pump 12 well in excess of a steady-state pump speed. The method 100 is executed only in response to certain temperature-based enabling conditions, with the measured temperature (arrow $T_F$) of a volume of fluid 14 circulated by the fluid pump 12 being measured by a thermocouple or other suitable temperature sensor 19 that is positioned with respect to a fluid sump 16 of the vehicle 10.

The vehicle 10 may include an internal combustion engine 11 that is selectively connected to the driveline via an input damping assembly 23. While not shown for illustrative simplicity, the vehicle 10 may include an engine-driven main pump, or it may forego use of such a device. The vehicle 10 includes a transmission 34 having clutches (not shown) and at least one electric machine, e.g., a motor/generator unit (MGU) 20. In other embodiments the MGU 20 may be separate from the transmission 34 as shown. In either embodiment, the fluid pump 12 delivers fluid 14 at line pressure (arrow PL) to the transmission 34 and possibly the MGU 20, e.g., for lubricating and cooling of the windings of the MGU 20.

Still referring to FIG. 1, the fluid pump 12 and a rechargeable DC power source 18, e.g., a multi-cell DC battery pack, are electrically connected to a power inverter module (PIM) 22 via a DC bus 13. Relays or contactors (not shown) may be used in conjunction with the DC bus 13 to selectively disconnect the DC power source 18 from the PIM 22 as needed. The PIM 22 may also be electrically connected to the MGU 20 over an AC bus 15. The transmission 34 may include an output member 25 that delivers output torque (arrow To) to a drive axle(s) 28 of the vehicle 10, and ultimately to a set of drive wheels 30.

Figures 3, 4:
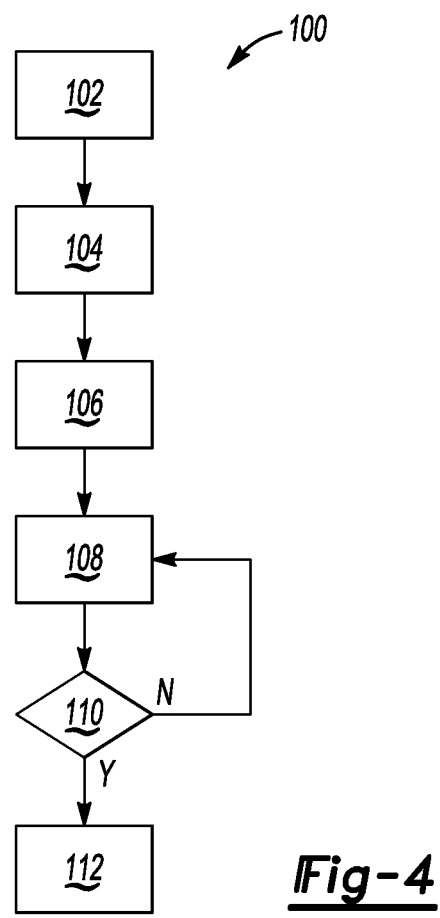
FIG. 3 is an example lookup table usable for controlling the fluid pump of FIG. 1.
FIG. 4 is a flow chart describing an example method for controlling the speed of the fluid pump shown in FIG. 1.

The controller 40 of FIG. 1 executes the instructions or code embodying the various steps of the method 100 of FIG. 4 from a tangible, non-transitory storage medium 42. Execution of the method 100 allows a processor 44 of the controller 40 to maintain the required line pressure (arrow $P_L$). The fluid pump 12 draws some of the fluid 14 from the sump 16 when the fluid pump 12 is commanded on by the controller 40. When the vehicle 10 has been operating for an extended duration, the fluid 14 becomes warm. The fluid 14 fills the various fluid passages and devices that form the hydraulic system within the vehicle 10, and thus the steady-state speed of the fluid pump 12 is sufficient for ensuring rapid delivery of line pressure (arrow $P_L$) to the transmission 34, e.g., to any of the clutches required for cranking and starting the engine 11 and/or for launching the vehicle 10 from a standstill.

The controller 40 may be configured as one or more digital computers each having, in addition to the processor 44 and the storage medium 42, e.g., read only memory (ROM), flash memory, or other magnetic or optical storage media, any required amount of transitory memory such as random access memory (RAM) and electrically-erasable programmable read only memory (EEPROM). The controller 40 may also include a high-speed clock, analog-to-digital (A/D) and digital-to-analog (D/A) circuitry, and input/output circuitry and devices (I/O), as well as appropriate signal conditioning and buffer circuitry.

A lookup table 46 is also recorded via the storage medium 42 of the controller 40 shown in FIG. 1. The processor 44 selectively reads or otherwise extracts an overspeed value and a calibrated duration from the lookup table 46 in response to a threshold low temperature of the fluid 14, as determined using the measured temperature (arrow $T_F$) from the temperature sensor 19. Thus, the commanded pump speed (arrow $N_P$) may be either the steady-state speed or, temporarily, the steady-state speed plus a calibrated overspeed value.

Figure 2:
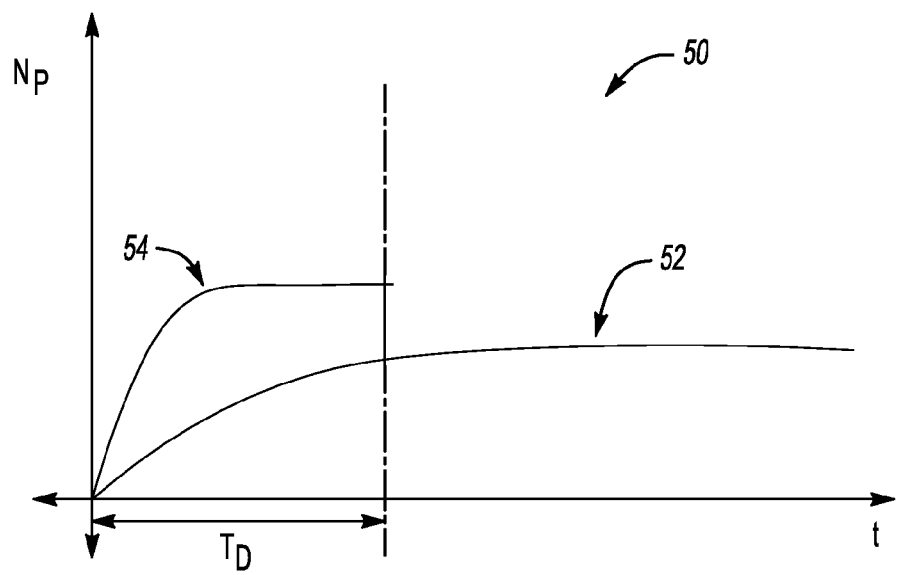
FIG. 2 is a plot of changing pump speed (vertical axis) versus time (horizontal axis) for the fluid pump shown in FIG. 1.

Referring to FIG. 2, a time plot 50 describes an example of the steady-state speed (trace 52), the calibrated overspeed value (trace 54), and the calibrated duration ($t_D$) for the fluid pump 12 shown in FIG. 1. The time plot 50 is illustrative of a low-temperature application, e.g., the measured fluid temperature ($T_F$) reaches $-40°$ C. Such temperatures can change the viscosity of the fluid 14, rendering the fluid 14 thick and difficult to circulate. The process of soaking occurs for an extended period of time after shutdown of the vehicle 10, wherein the fluid 14 slowly drains from the transmission 34 and into the sump 16. In extreme temperatures, line pressure (arrow $P_L$) may be slow to develop when the vehicle 10 is again started. That is, on restart the fluid pump 12 works mainly against air within the hydraulic system, which provides little resistance to the rotation of any driven elements of the fluid pump 12. At the same time, the fluid 14 is highly viscous. An unacceptably long delay may occur before sufficient line pressure (arrow $P_L$) is achieved under such circumstances. Execution of the method 100 by the controller 40 of FIG. 1 is intended to reduce this delay and thereby improve the overall driving experience.

After detecting an enabling condition indicative of a completed soak period of the transmission 34 shown in FIG. 1, such as by measuring the fluid temperature ($T_F$), or in another embodiments setting a timer after an engine/motor-off event, the controller 40 determines the commanded pump speed (arrow $N_P$) as a function of the calibrated overspeed value (trace 54) and the steady-state speed (trace 52). After applying the elevated speed for the calibrated duration ($t_D$), the controller 40 reverts to the steady-state speed (trace 52). The fluid temperature measurement variation is described hereinafter for illustrative consistency. However, those of ordinary skill in the art will appreciate that the present overspeed approach may be used regardless of how the soak condition is detected without departing from the intended inventive scope.

A non-limiting example of the lookup table 46 is shown in FIG. 3. The specific overspeed value (No) may be extracted by the controller 40 from the lookup table 46. The measured fluid temperature ($T_F$) is shown for three possible values, i.e., −10° C., −25° C., and −40° C. The overspeed (No) for these different example temperature values is 5-10 RPM, 30-40 RPM, and 50-100 RPM, respectively. The calibration duration in this embodiment ($t_D$) ranges from about 1-5 seconds (s) at −10° C., 10-15 s at −25° C., and about 20-30 seconds at −40° C. Here, the calibrated duration ($t_D$) may be determined by the controller 40 as a linear function of the measured fluid temperature ($T_F$), i.e., dropping linearly from, e.g., 1-5 s at −10° C. to 20-30 s at −40° C. The actual values populating the lookup table 46 can vary without departing from the intended inventive scope. As will be understood by those of ordinary skill in the art, the actual values will be determined in a manner that depends upon the viscosity profile of the fluid 14, the design of the fluid pump 12 including its steady-state speed, and the geometry of the fluid passages through which the fluid 14 is moved.

Referring to FIG. 4, an example of the method 100 begins at step 102, wherein the controller 40 detects an enabling condition. Step 102 may entail, for example, detecting a key-on event of the vehicle 10. The method 100 then proceeds to step 104.

At step 104, the controller 40 receives the measured fluid temperature (arrow $T_F$) from the temperature sensor 19. The method 100 then proceeds to step 106 once the fluid temperature (arrow $T_F$) is recorded in the storage medium 42.

At step 106, the processor 44 references the recorded lookup table 46 and extracts the corresponding values for the overspeed value (No) and the calibrated duration ($t_D$) of FIG. 3 and proceeds to step 108.

At step 108, the controller 40 of FIG. 1 next calculates the commanded pump speed (arrow $N_P$) as a function of the overspeed value (No) and the steady-state speed of the fluid pump 12, e.g., by adding the overspeed value (No) to the steady-state pump speed, and then applies the commanded pump speed (arrow $N_P$) at this elevated speed for the calibrated duration ($t_D$). The controller 40 may start a timer as part of step 108.

At step 110, while the timer of step 108 is running, the controller 40 may reference the lookup table 46 and repeat step 108, thereby continually adjusting the pump overspeed value based on the measured temperature (arrow $T_F$). The method 100 proceeds to step 112 when the counter has finished counting through the calibrated duration ($t_D$).

At step 112, the controller 40 reduces the commanded pump speed (arrow $N_P$) to the steady-state speed for the duration of the operation of the vehicle 10. During normal operation, temperature of the fluid 14 is not expected to return to sub-zero levels. Therefore, the controller 40 can continue to control the fluid pump 12 of FIG. 1 using the steady-state speed until the measured fluid temperature (arrow $T_F$) drops below the thresholds of the lookup table 46.

Using the method 100 as described above, a nearly proportional reduction may be obtained in a delay that is normally experienced while filling a hydraulic system in extreme cold weather conditions. Overspeed values may be applied that, in some instances, are approximately equal to the steady-state speed of the fluid pump 12, e.g., about 65% to 125% of the steady-state value. For instance, steady-state speeds of about 150 RPM can be temporarily raised by adding an overspeed value of 100 to 150 RPM to effectively halve the wait time needed for sufficient hydraulic pressurization. Therefore, a controlled application of the present approach may result in realization of improved vehicle driveaway times after a cold weather transmission soak in vehicle's employing a torque-limited fluid pump of the type described herein.

While the best modes for carrying out the invention have been described in detail, those familiar with the art to which this invention relates will recognize various alternative designs and embodiments for practicing the invention within the scope of the appended claims.

The invention claimed is:

1. A system comprising:
   a fluid sump;
   a torque-limited fluid pump having a calibrated steady-state speed, wherein the torque-limited fluid pump draws fluid from the fluid sump and circulates the fluid under pressure;
   a component that receives the fluid that is circulated by the torque-limited fluid pump;
   a temperature sensor positioned with respect to the fluid sump and configured to measure a temperature of the fluid in the fluid sump; and
   a controller having a processor and a tangible, non-transitory storage medium on which is recorded instructions for controlling the speed of the torque-limited fluid pump;
   wherein the controller is configured to:
      detect a soak condition of the component using the measured temperature;
      calculate a speed of the torque-limited fluid pump as a function of the calibrated steady-state speed and a calibrated overspeed value; and
      command the calculated speed from the torque-limited fluid pump for a calibrated duration only when the soak condition is detected.

2. The system of claim 1, wherein the controller is further configured to reduce the speed of the torque-limited fluid pump to the calibrated steady-state speed after the calibrated duration has elapsed.

3. The system of claim 1, wherein the calibrated duration is determined by the controller as a linear function of the measured fluid temperature.

4. The system of claim 3, wherein the calibrated duration at a measured temperature of 0° C. is less than about 5 s, and wherein the calibrated duration at a measured temperature of −40° C. is less than about 30 s.

5. The system of claim 1, further comprising a direct current (DC) power supply, wherein the torque-limited fluid pump is an electric fluid pump that is driven via electricity supplied by the DC power supply.

6. The system of claim 5, further comprising a power inverter module that is electrically connected to the DC power supply, wherein the torque-limited fluid pump is electrically connected to the power inverter module.

7. The system of claim 1, wherein the component is a vehicle transmission, and wherein the torque-limited fluid pump is a transmission pump.

8. The system of claim 1, wherein the calibrated overspeed value is approximately equal to the calibrated steady-state speed.

9. A method comprising:
   measuring a temperature of a fluid in a fluid sump of a transmission using a temperature sensor;
   detecting a soak condition of the transmission by comparing, via a controller, the measured fluid temperature to a threshold temperature;
   calculating a pump speed of a torque-limited fluid pump as a function of a steady-state speed of the torque-limited fluid pump and a calibrated overspeed value during the soak condition;

temporarily increasing the steady-state speed of the torque-limited fluid pump for a calibrated duration only when the soak condition is detected; and reducing the speed of the torque-limited fluid pump to the steady-state speed after the calibrated duration has elapsed.

10. The method of claim 9, further comprising:

recording the calibrated overspeed value and the calibrated duration, indexed by different fluid temperatures, in a lookup table that is accessible by the controller.

11. The method of claim 10, further comprising:

electrically connecting the torque-limited fluid pump to a power inverter module in a vehicle; and using the electrically-connected torque-limited fluid pump to deliver the fluid to a vehicle transmission.

12. The method of claim 9, wherein the calibrated overspeed value is approximately equal to the steady-state speed.

13. A system for controlling a torque-limited fluid pump, the system comprising:

a processor in communication with the torque-limited fluid pump; and tangible, non-transitory storage medium in communication with the processor, and on which is recorded a steady-state speed of the torque-limited fluid pump, a lookup table, and instructions for controlling the speed of the torque-limited fluid pump;

wherein the processor is configured to execute the instructions from the storage medium to thereby:

receive a measured fluid temperature describing a temperature of a supply of fluid circulated via the torque-limited fluid pump;

read the steady-state speed of the torque-limited fluid pump from the storage medium;

extract, from the lookup table, a calibrated overspeed value and a calibrated duration corresponding to the measured fluid temperature; and temporarily increase the steady-state speed of the torque-limited fluid pump by adding a calibrated overspeed value to the steady-state speed, for a calibrated duration, until the measured fluid temperature exceeds a temperature threshold.

14. The system of claim 13, wherein the processor is further configured to reduce the speed of the torque-limited fluid pump to the steady state speed after the calibrated duration has elapsed.

15. The system of claim 14, further comprising:

a temperature sensor positioned with respect to the fluid sump and configured to measure the fluid temperature in proximity to the fluid sump.

16. The system of claim 14, wherein the processor linearly increases the calibrated duration between a measured temperature of −10° C. and a measured temperature of −40° C.

17. The system of claim 14, wherein the processor is a component of a hybrid vehicle controller and the torque-limited fluid pump is an electric pump for a vehicle transmission.

* * * * *